Jan. 1, 1935.   H. GOLDEN   1,986,772
ANTIRATTLING DEVICE
Filed June 27, 1934

INVENTOR
Harry Golden
BY
ATTORNEY

Patented Jan. 1, 1935

1,986,772

UNITED STATES PATENT OFFICE 1,986,772

ANTIRATTLING DEVICE

Harry Golden, New York, N. Y., assignor to Magna Products Corp., New York, N. Y.

Application June 27, 1934, Serial No. 732,584

4 Claims. (Cl. 180—69)

This invention relates to anti-rattling devices, and more particularly to a device which can be readily and conveniently attached to movable panels of automobile hoods to prevent rattling thereof.

The rattling of movable panels of automobile hoods is a common source of annoyance; and expedients heretofore employed to prevent such rattling have been objectionable in that they soon become loose and ineffective. Also in many instances, prior anti-rattling devices have been made for certain popular types of automobiles only, and were not adapted to effectively fit the movable panels of all types of automobiles.

It is therefore an object of this invention to provide an anti-rattling device for movable panels of automobile hoods which will snugly fit the panels and remain in proper position for an indefinite period of time.

A further object is the provision of an anti-rattling device which can be readily and conveniently fitted to the movable panels of automobile hoods of all shapes without necessitating alteration of any kind.

These and other objects are attained by the novel construction, combination and arrangement of parts hereinafter described and shown in the accompanying drawings, constituting a material part of this disclosure, and in which.

Figure 1:
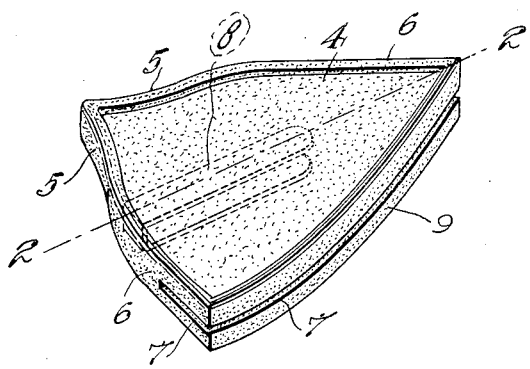
Fig. 1 is a perspective of my anti-rattling device.
Figure 3:
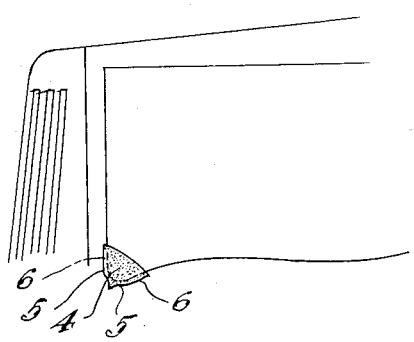
Fig. 3 is an elevational view of a movable panel of an automobile hood showing my anti-rattling device applied thereto.

Referring to Fig. 1, the anti-rattling device is shown to comprise a substantially triangular shaped body 4 made preferably of rubber or a similar material. Near the apex of the body 4, the portions 5 of the side walls form an angle exceeding 100 degrees. The portions 6 of the side walls of the body are at an angle to the portions 5, and the portions 6 extended form with each other an angle less than 60 degrees. By means of this arrangement of angles, the anti-rattling device is adapted to effectively fit the corner of the movable panel of any automobile hood, regardless of the shape of the corner. In Fig. 3, the anti-rattling device is shown applied to the corner of the movable panel of a popular type of automobile in which the corner has an angle less than 90 degrees.

Figure 2:
Fig. 2 is a sectional view taken on line 2—2 of Fig. 1.

The body 4 is split internally substantially as far as the apex thereof as indicated in Fig. 2; and as shown in Fig. 1 the base 9 is split, and also a section of the portions 6 of the side walls is split. By extending the split 7 to include sections of the portions 6, the device is adapted to be conveniently adjusted to fit practically any type of corner.

In order to prevent the device from slipping and falling off a corner after a period of use, a U-shaped flat spring 8 is embedded in the upper and lower walls of the body, embracing the split 7, as shown in Fig. 2. This spring causes the device to always tightly grip a corner, without danger of being jarred loose by vibrations of the automobile.

From the above description it will be seen that I have provided a simple and inexpensive device for effectively preventing rattling of movable panels of automobile hoods, the device being adapted to be readily and conveniently attached to corners of all shapes without alteration.

The foregoing disclosure is to be regarded as descriptive and illustrative only, and not as restrictive or limitative of the invention, of which obviously an embodiment may be constructed including modifications without departing from the general scope herein indicated and denoted in the appended claims.

Having thus described my invention, what I claim as new and desire to secure by Letters Patent, is:—

1. An anti-rattling device adapted to be attached to a corner of a movable panel of an automobile hood, comprising a substantially triangular shaped body of rubber internally split, the sides of the body adjacent the apex thereof forming an angle greater than 90 degrees, said sides having portions when extended forming an angle less than 60 degrees, the base and a portion of the sides of the body being also split.

2. An anti-rattling device adapted to be attached to a corner of a movable panel of an automobile hood, comprising a substantially triangular shaped body of rubber or similar material internally split, the sides of the body adjacent the apex diverging into portions which when extended form an angle less than the angle at the apex, the base and the last mentioned side portions being also split.

3. An anti-rattling device adapted to be attached to a corner of a movable panel of an automobile hood, comprising a substantially triangular shaped body of rubber internally split, the sides of the body adjacent the apex thereof forming an angle greater than 90 degrees, said sides having portions when extended forming an angle less than 60 degrees, the base and a portion of the sides of the body being also split, and a spring means embedded in the top and bottom walls of the body.

4. An anti-rattling device adapted to be attached to a corner of a movable panel of an automobile hood, comprising a substantially triangular shaped body of rubber or similar material internally split, the sides of the body adjacent the apex diverging into portions which when extended form an angle less than the angle at the apex, the base and the last mentioned side portions being also split, and a spring means embedded in the top and bottom walls of the body.

HARRY GOLDEN.